United States Patent
Davis et al.

(10) Patent No.: US 10,857,885 B1
(45) Date of Patent: Dec. 8, 2020

(54) IN-VEHICLE DISPLAY

(71) Applicant: Aptiv Technologies Limited, St. Michael (BB)

(72) Inventors: J. Roger Davis, Russiaville, IN (US); John D. Newton, Auckland (NZ)

(73) Assignee: Aptiv Technologies Limited, St. Michael (BB)

( * ) Notice: Subject to any disclaimer, the term of this patent is extended or adjusted under 35 U.S.C. 154(b) by 0 days.

(21) Appl. No.: 16/454,436

(22) Filed: Jun. 27, 2019

(51) Int. Cl.
```
G02B 5/04       (2006.01)
B60K 37/02      (2006.01)
G02F 1/13357    (2006.01)
G02B 27/01      (2006.01)
```

(52) U.S. Cl.
CPC .............. *B60K 37/02* (2013.01); *G02B 5/04* (2013.01); *G02F 1/133603* (2013.01); *B60Y 2400/92* (2013.01); *G02B 2027/0118* (2013.01)

(58) Field of Classification Search
CPC ........................... G02B 5/04; G02G 1/133603
USPC ......................................... 345/7, 8; 359/630
See application file for complete search history.

(56) References Cited

U.S. PATENT DOCUMENTS

| | | | |
|---|---|---|---|
| 5,278,532 A | 1/1994 | Hegg et al. | |
| 5,903,328 A | 5/1999 | Greene et al. | |
| 6,369,867 B1 * | 4/2002 | Ge | G02F 1/133305 349/122 |
| 6,680,761 B1 * | 1/2004 | Greene | G02F 1/13336 349/153 |
| 7,488,104 B2 * | 2/2009 | Hamada | G02B 6/0036 362/561 |
| 8,582,045 B2 * | 11/2013 | Kang | G02F 1/133502 349/58 |
| 9,612,468 B1 * | 4/2017 | Liu | G02B 27/1066 |
| 2003/0169506 A1 | 9/2003 | Furuya | |
| 2014/0306966 A1 | 10/2014 | Kuo et al. | |
| 2017/0124931 A1 | 5/2017 | Bell et al. | |
| 2018/0079370 A1 | 3/2018 | Davis et al. | |
| 2019/0285902 A1 * | 9/2019 | Ouderkirk | G02B 27/0955 |
| 2019/0384084 A1 | 12/2019 | Tang et al. | |

FOREIGN PATENT DOCUMENTS

CN    107589578    1/2018

OTHER PUBLICATIONS

"Partial European Search Report", European Application No. 20173335.9, dated Oct. 6, 2020, 16 pages.

* cited by examiner

*Primary Examiner* — Calvin C Ma
(74) *Attorney, Agent, or Firm* — Colby Nipper PLLC

(57) ABSTRACT

An illustrative example embodiment of a display includes a cover, a plurality of display panels that collectively establish a display area, and a polarizer between the display panels and the cover. The polarizer is coextensive with the entire display area.

13 Claims, 3 Drawing Sheets

IN-VEHICLE DISPLAY

BACKGROUND

The trend in modern automotive vehicle interiors includes an increasing amount of electronic technology, such as in-vehicle displays, which are useful for showing a driver or passenger a variety of types of information. One issue associated with typical displays is the relatively limited screen space. Instead of presenting visual information regarding multiple systems or features a typical display shows only one type of information at a time. One approach to providing more visual display information includes placing multiple displays within a vehicle but this presents aesthetic challenges. Another possibility includes a single, larger display but increasing the size of a display tends to increase cost, which is undesirable.

SUMMARY

An illustrative example embodiment of a display includes a cover, a plurality of display panels that collectively establish a display area, and a polarizer between the display panels and the cover. The polarizer is coextensive with the entire display area.

In an example embodiment having one or more features of the display of the previous paragraph, the cover is a monolithic single piece that is coextensive with the entire display area and the polarizer is a monolithic single piece.

An example embodiment having one or more features of the display of any of the previous paragraphs includes a prism situated along an interface between a first one of the display panels and a second one of the display panels, the prism having reflective surfaces situated at an oblique angle relative to the display panels.

An example embodiment having one or more features of the display of any of the previous paragraphs includes at least one controller that controls visual content on the display panels, the at least one controller causing at least some of the visual content near the prism to have at least one of a lower resolution or a lower intensity relative to a resolution or intensity of another portion of the visual content further from the prism.

An example embodiment having one or more features of the display of any of the previous paragraphs includes a single backlight module on a first side of the display panels, the backlight module being configured to provide lighting for the entire display area.

An example embodiment having one or more features of the display of any of the previous paragraphs includes a light blocking member situated along an interface between two of the display panels, the light blocking member preventing light from the backlight module from being visible on a second side of the display panels that is opposite the first side.

An example embodiment having one or more features of the display of any of the previous paragraphs includes a case and wherein the backlight module is situated in the case.

An example embodiment having one or more features of the display of any of the previous paragraphs includes a ¼ wavelength retarder between the polarizer and the display panels.

In an example embodiment having one or more features of the display of any of the previous paragraphs, at least one of the display panels comprises a liquid crystal display panel, the at least one of the display panels includes an active area and an inactive area, the inactive area is closer to an edge of the at least one of the display panels than the active area, the active area includes a plurality of pixels having a first resolution, the inactive area includes a plurality of pixels having second resolution, and the second resolution is lower than the first resolution.

An example embodiment having one or more features of the display of any of the previous paragraphs includes at least one controller that controls visual content on the display panels, the at least one controller causing a first portion of the visual content with a first resolution to appear on the active area and a second portion of the visual content with a second resolution to appear on the inactive area, and wherein the second resolution is lower than the first resolution.

In an example embodiment having one or more features of the display of any of the previous paragraphs, the display panels comprise frameless transparent panels.

In an example embodiment having one or more features of the display of any of the previous paragraphs, a size of at least one of the display panels is different than a size of another one of the display panels.

Another illustrative example embodiment of a display includes a cover, a plurality of display panels that collectively establish a display area, and a prism situated along an interface between a first one of the display panels and a second one of the display panels. The prism has reflective surfaces situated at an oblique angle relative to the display panels.

An example embodiment having one or more features of the display of any of the previous paragraphs includes a prism situated along each interface between adjacent ones of the display panels.

An example embodiment having one or more features of the display of any of the previous paragraphs includes at least one controller that controls visual content on the display panels, the at least one controller causing at least some of the visual content near the prism to have at least one of a lower resolution or a lower intensity relative to a resolution or intensity of another portion of the visual content further from the prism.

Another illustrative example embodiment of a display includes a cover and a plurality of display panels that collectively establish a display area. At least one of the display panels comprises a liquid crystal display panel and includes an active area and an inactive area. The inactive area is closer to an edge of the at least one of the display panels than the active area. The active area includes a plurality of pixels having a first resolution, the inactive area includes a plurality of pixels having second resolution, and the second resolution is lower than the first resolution.

An example embodiment having one or more features of the display of any of the previous paragraphs includes at least one controller that controls visual content on the display panels, the at least one controller causing a first portion of the visual content with a first resolution to appear on the active area and a second portion of the visual content with a second resolution to appear on the inactive area, and wherein the second resolution is lower than the first resolution.

The various features and advantages of at least one disclosed example embodiment will become apparent to those skilled in the art from the following detailed description. The drawings that accompany the detailed description can be briefly described as follows.

DETAILED DESCRIPTION

Figure 1:
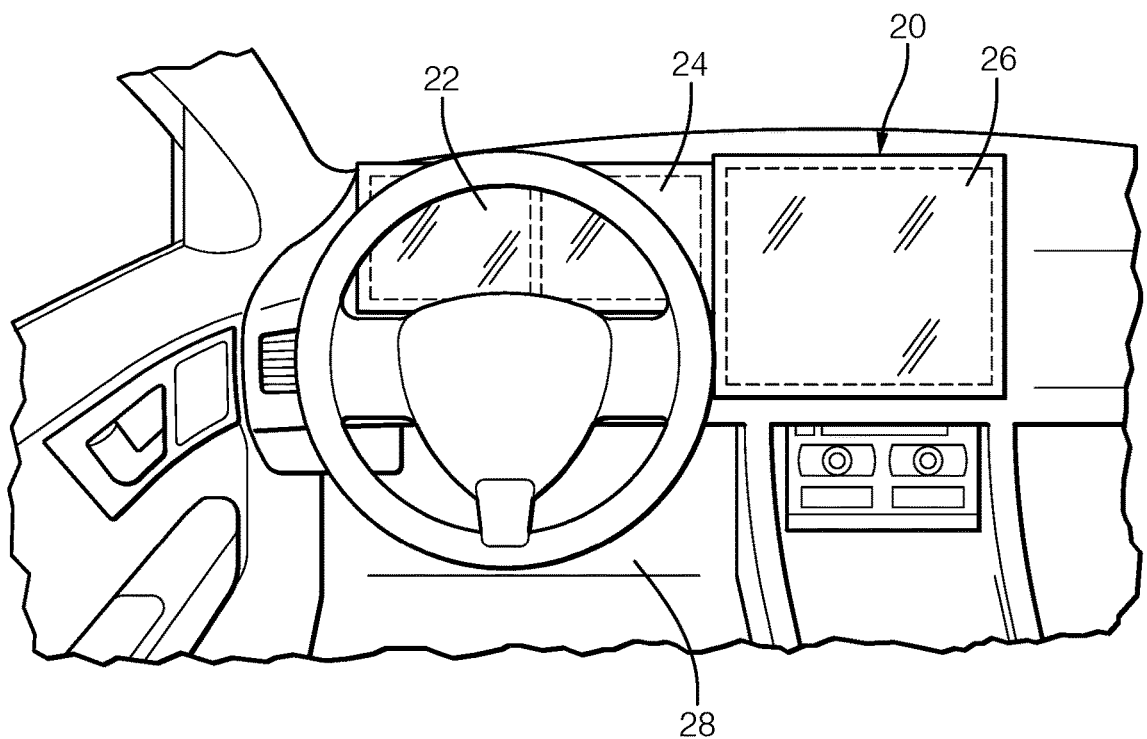
FIG. 1 diagrammatically illustrates selected portions of a vehicle interior including an in-vehicle display designed according to an embodiment of this disclosure.

FIG. 1 illustrates a display 20 including a plurality of display panels 22, 24, and 26. The display panels 22, 24 and 26 collectively establish or define the display area of the display 20, which is the area in which visual information may be presented. The display 20 includes features that provide a visual appearance of a single display panel across the entire display 20 even though the display 20 includes multiple display panels 22-26.

The display 20 is situated within an interior 28 of a vehicle and can be referred to as an in-vehicle display. The display 20 is useful for providing a variety of types of visual information. For example, part of the display may be used for instrument panel information including representations of a speedometer, tachometer, and fuel gauge. Other parts or sections of the display may be used to provide other types of information regarding vehicle status, navigation, infotainment, or vehicle system settings.

The shape or configuration of the display 20 may vary depending on the style of vehicle or the type of information that will be displayed. In the illustrated example, the individual display panels have different sizes or shapes. In particular, the display panel 26 has larger dimensions than the display panels 22 and 24. A variety of configurations are possible and those skilled in the art who have the benefit of this description will realize how to arrange multiple display panels to achieve an overall display that meets their particular needs.

Figure 2:
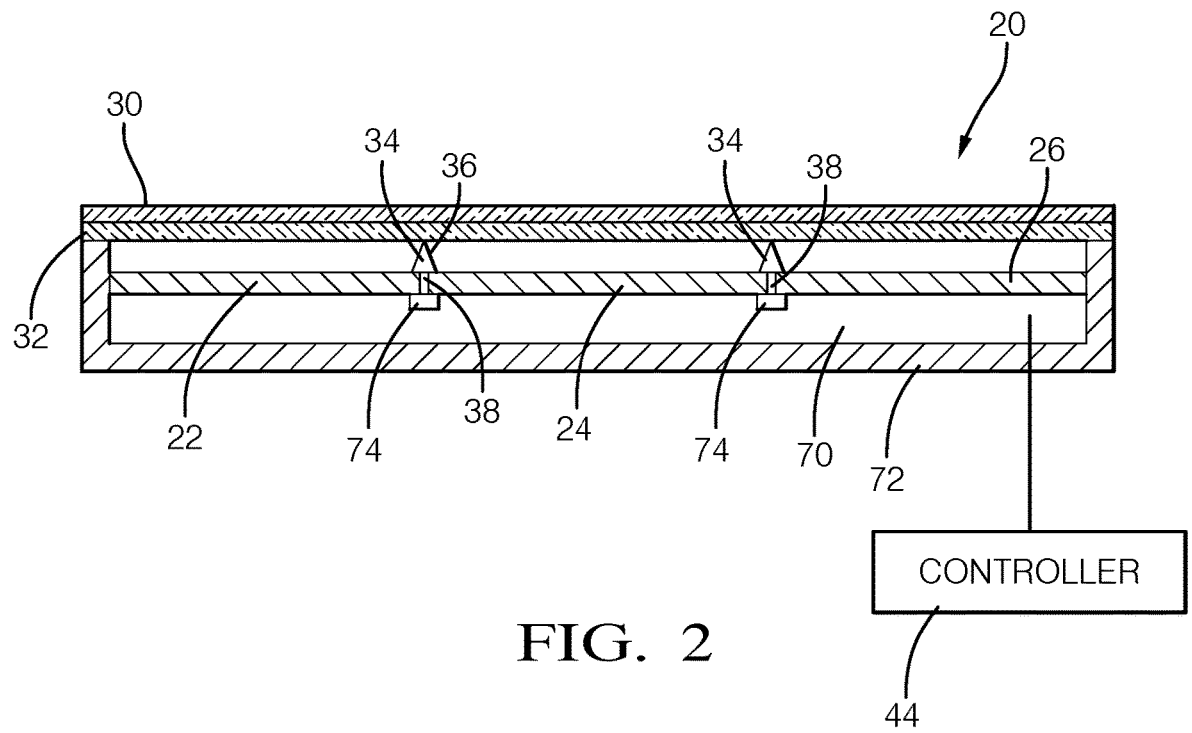
FIG. 2 schematically illustrates features of an example embodiment of a display.

FIG. 2 schematically illustrates a plurality of features included in an example embodiment of a display 20 that achieve a visual appearance of the display 20 consistent with or corresponding to a single display panel even though multiple display panels 22, 24, and 26 are included. The example display 20 includes a cover 30 that extends over the entire display area collectively established by the display panels 22, 24, and 26. In this example, the cover 30 is a monolithic, single piece of material that provides a continuous, uninterrupted visual appearance across an exposed surface of the cover 30.

In this example, the display panels 22, 24, and 26 are frameless panels of glass or a suitable polymer material. The display panels 22-26 respectively do not include a polarizer on one side of the panels. Typical display panels include two polarizers; one near the backlight side and another on the top or viewable side. The display panels 22-26 in the disclosed example embodiment include the polarizer near the backlight side but do not include the one near the top or viewable side. Instead, the display 20 includes a single polarizer 32 that is coextensive with the entire display area established collectively by the display panels 22-26. The individual display panel polarizers near the respective backlight sides will be aligned with the polarizer 32, which may be at an angle of approximately 90° from the polarizer 32.

In the illustrated example, the polarizer 32 is coextensive with the cover 30. The polarizer 32 comprises a single, monolithic piece or layer in this example. Including a single cover lens 30 and a single polarizer 32 across the entire display area minimizes or eliminates visual discontinuities that otherwise would be apparent when utilizing multiple display panels adjacent each other. Including a single polarizer 32 over the entire active display area and the active and inactive areas of each display panel 22-26 contributes to or establishes a visual appearance of the display 20 that is consistent with a single display panel rather than multiple panels even though multiple display panels 22-26 are included.

One aspect of using a single polarizer 32 is that the illustrated embodiment does not require paint on the underside of the cover 30 or on the display panels 22-26 along regions corresponding to or aligned with the inactive areas of the display panels 22-26. The traditional approach of including paint along those areas of a display would interrupt the continuity of a single display effect when multiple display panels are placed adjacent each other. For example, even though black paint is typically used, the appearance of the display panel when it is turned off is not identical to the appearance of the black paint and that would lead to discontinuities in the appearance of the display 20 under those conditions. Utilizing a single polarizer 32 without such painted regions avoids that effect and, instead, provides a more uniform, single-display visual effect across the entire display 20.

The embodiment of FIG. 2 also includes a prism 34 having reflective surfaces 36 at each interface 38 between adjacent display panels 22-26. In this example, the reflective surfaces 36 comprise a mirror surface. The surfaces 36 are oriented at an oblique angle relative to the forward or display surface of the display panels 22-26. In some embodiments, the surfaces 36 are situated at an angle that is at least 80° relative to the surface of the corresponding display panel. In some embodiments, having the reflective surfaces 36 situated at an angle as close as possible to 90° reduces or minimizes distortion of the displayed visible information on the portion of the display panel adjacent the prism 34.

Figure 3:
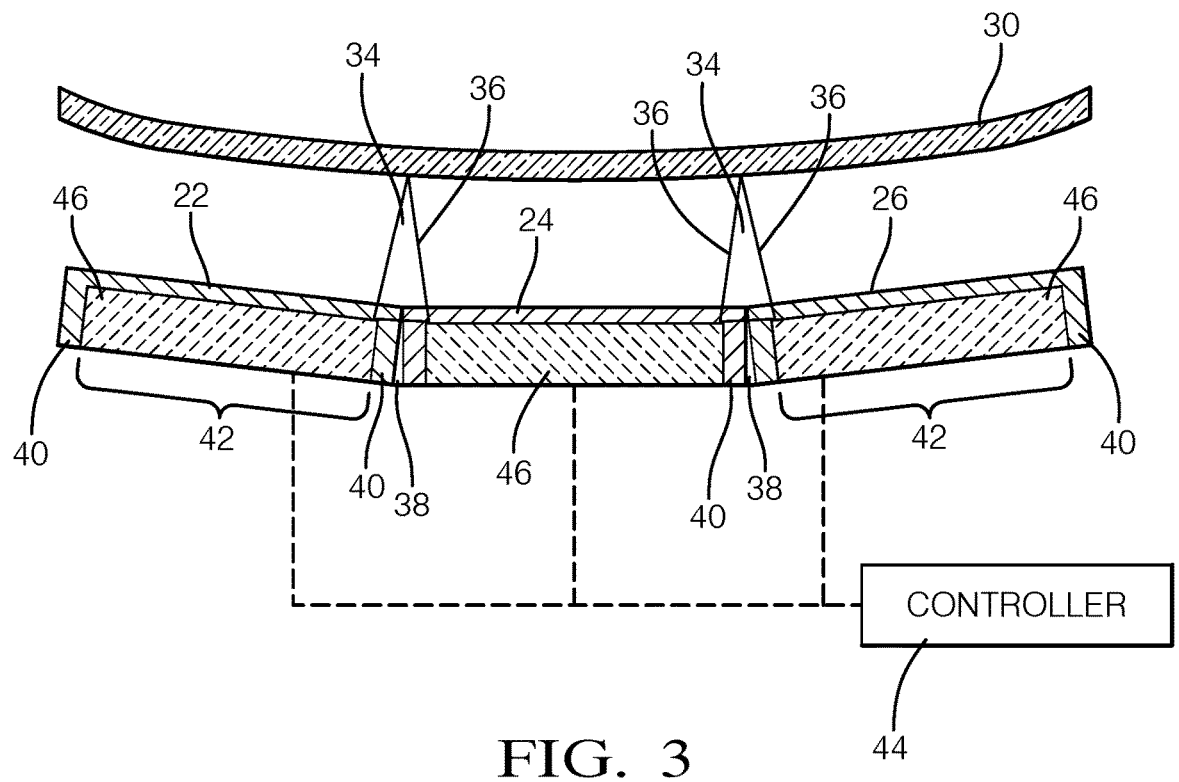
FIG. 3 schematically illustrates selected features that may be useful in some display embodiments.

Referring to FIG. 3, an example arrangement of display panels 22, 24, and 26 and prisms 34 includes the prisms 34 covering over or being coextensive with the inactive areas 40 of each of the display panels 22-26. As known, displays such as liquid crystal displays include active areas 42 and inactive areas 40. The prisms 34 effectively cover the inactive areas 40 and reflect some of the visual display in a manner that provides an appearance of a visual display over the inactive areas 40. Without the prisms 34, the inactive areas 40 may appear as borders or blank regions within a display, which would tend to reveal the presence of multiple display panels instead of appearing as a single or continuous display panel across the entire display 20. With the prisms 34, on the other hand, some displayed content will appear on the surfaces 36 and an observer of the display 20 is less likely to notice that there are multiple display panels within the display 20.

In this example, a controller 44 that controls or drives backlight modules 46 of the displays 22-26 controls the content of the displayed images so that the effects of the presence of the prisms 34 can be minimized. The reflective surfaces 36 will affect the brightness of the display compared to that which is shown on the active area of the adjacent display panel. There will also be some distortion on the reflective surface 36 compared to that which appears on the display panel immediately adjacent the prism 36. The controller 44 controls the manner in which information or graphics are displayed on the panels 22-26 so that at least some of the visual content near the prisms 36 has at least one of a lower resolution, lower intensity, or lower brightness relative to the resolution, intensity, or brightness of another portion of the visual content that is further from the prisms 36. For example, the position of certain visual features that will appear on certain ones of the display panels 22-26 can be strategically placed relative to the edges of the active areas 42 to minimize the visual effect of the prisms 34. Controlling the displayed information or graphical content in this manner enhances the single-display appearance and avoids a driver or passenger in the vehicle interior 28 noticing the presence of multiple display panels 22-26 within the display 20.

Another feature of FIG. 3 is that the cover 30 is curved. Utilizing multiple display panels 22-26 allows for orienting them relative to each other to generally follow the curvature of the cover 30 without requiring the panels 22-26, themselves, to be curved. Using flat display panels 22, 24, and 26 in an arrangement as schematically shown in FIG. 3 with a curved cover 30 provides cost savings compared to using one or more curved display panels when a curved display 20 is desired.

In the example embodiment of FIG. 3, the display panels 22-26 are low temperature polysilicon liquid crystal display panels. They are configured in a chip on board manner, which means that the timing controller (schematically represented by the controller 44) is off-glass to reduce the size of the inactive area bordering the edges of the display panels. The timing controller is the integrated circuit that drives the timing of the display panel in order to display an image based upon appropriate data.

Figure 4:
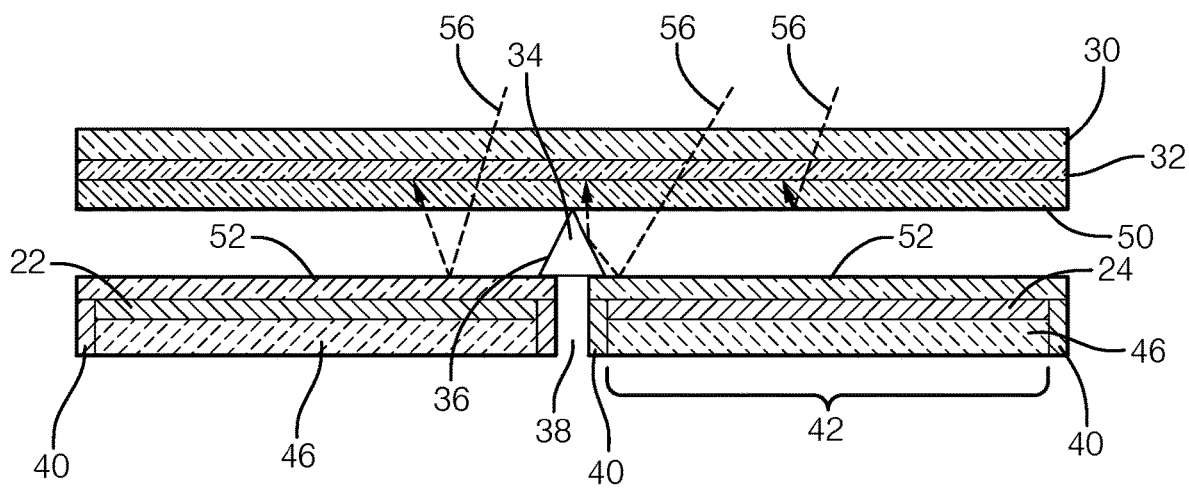
FIG. 4 schematically illustrates selected features that may be useful in some display embodiments.

The prisms 34 provide a feature to mask or eliminate the effects of the interfaces 38 between the display panels 22-26 and the corresponding inactive areas 40. FIG. 4 illustrates another feature included in some embodiments that is useful for addressing the issues presented by the gaps or interfaces 38 between the display panels. This example includes a circular polarizer to reduce air-surface specular Fresnel reflections and color shifts between components when the display 20 is turned off. In this example, a one-quarter wavelength retarder 50 is situated adjacent the polarizer 32. The polarizer 32 and the quarter wavelength retarder 50 can be laminated with the cover 30. The display panels 22 and 24 include a one-quarter wavelength retarder 52. The angular arrangement of the polarizer 32 and the quarter wavelength retarders 50, 52 are set to provide a desired level of contrast and brightness. Given this description, those skilled in the art will be able to arrange the particular components that are included in an embodiment having the features of FIG. 4.

The arrangement of FIG. 4 minimizes reflections of surrounding or nearby light passing through the cover 30 and reflecting back out. As schematically shown at 56, stray or ambient light may penetrate through the cover 30, but will not reflect out because of the presence of the circular polarizer, which is realized through the combination of a linear polarizer 32 and the one-quarter wavelength retarder 50 on the underside of the cover 30. The arrangement of FIG. 4 assists in hiding different deflections that would occur from the mirrored reflective surfaces 36 of the prism 34 compared to reflections from the display panels.

Figure 5:
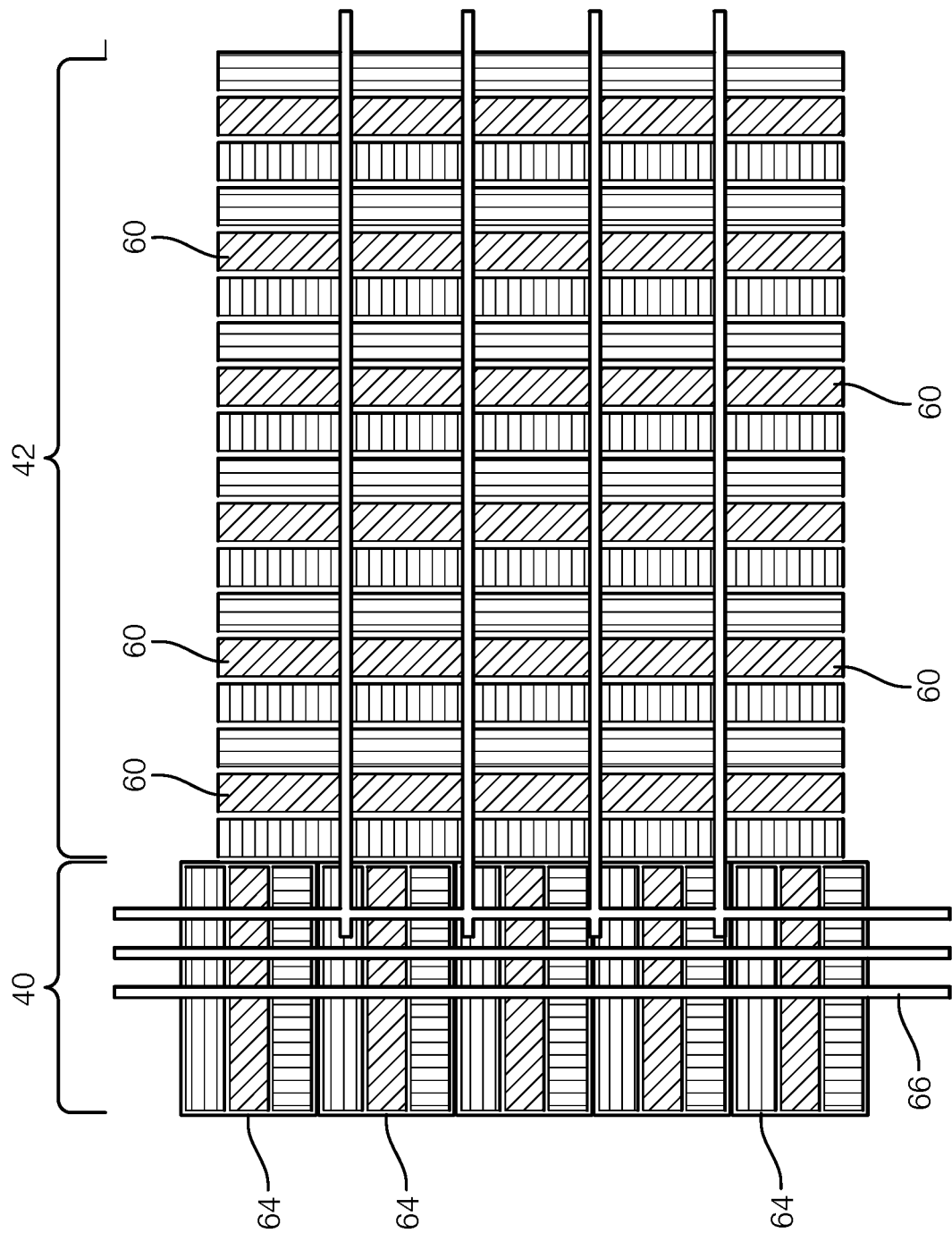
FIG. 5 schematically illustrates selected features that may be useful in some display embodiments.

FIG. 5 schematically illustrates a portion of a display panel configuration having another feature for minimizing the appearance of gaps in displayed content on the display 20 along the edges of the display panels 22-26. The active area 42 includes a plurality of pixels 60 that are high resolution pixels. The driver circuits 62 associated with the pixel 60 are schematically represented in FIG. 5. The inactive area 40 in this example, which may be along the borders of a display panel, includes low resolution pixels 64 and associated driver circuitry 66. The inactive area 40 typically has to accommodate the gate drivers, routing and the glass-to-glass bonding features for the display panel so it is not possible to include pixels 60 in the inactive area 40 like those that are in the active area 42. The example arrangement in FIG. 5 includes low resolution pixels 64 that can be accommodated within the limited space of the inactive area 40. Including lower resolution pixels 64 in the portions where the display panel would otherwise be completely inactive allows for providing some low resolution graphic content along the borders or edges of a display panel 22-26. This feature reduces or minimizes any visible gap between adjacent display panels.

Since the low resolution pixels 64 cannot display graphics or information at the same resolution as the pixels 60, the controller 44 (see FIG. 2 for example) strategically controls the graphical content of the display 20 so that lower resolution information is located in the areas where the low resolution pixels 64 are situated. The graphical content of the display 20 is arranged in a manner that takes advantage of the low resolution pixels 64 while avoiding a difference in appearance in those areas of the display 20 because a typical observer will not or is less likely to notice the lower resolution if the graphical content is strategically arranged.

The arrangement in FIG. 5 is another feature for minimizing or eliminating the appearance of interruptions within the display 20 associated with the edges of the display panels 22-26 and the interfaces between them.

Referring again to FIG. 2, that illustrated example embodiment includes the display panels 22, 24, and 26 as separate panels with a single backlight module 70 instead of having individual backlight modules for each panel. The backlight module 70 includes light emitting diodes, a light diffuser, and films to achieve a display using techniques and components that are known in the art. Utilizing a single backlight module 70 for all of the example display panels provides a more consistent image quality and appearance throughout the display 20. If different backlight modules were used for each of the panels, there is an increased possibility that slight differences in color or lighting, for example, may appear on different portions of the display 20 because of the differences in such display panels. Utilizing a single backlight module 70 allows for having the same type of light emitting diodes, films, and diffuser components so that the same type of lighting and viewing angle exists for all of the display panels 22-26. Another aspect of utilizing a single backlight module 70 is that a single electrical interface and a single driver circuit, which is represented by the controller 44, is all that is needed for operating the display 20.

Another feature of the example embodiment of FIG. 2 is a single case 72 that houses the backlight module 70 and the display panels 22-26. The single case 72 supports edges of the polarizer 32 and cover 30 in the illustrated embodiment. Utilizing a single case 72 may assist in positioning the display panels 22-26 closer together because there is no need to accommodate individual cases for each of those panels.

With the single backlight module 70, it may be possible that light from that module would be visible through the interfaces 38 between the display panels 22-26. The example embodiment includes light blocking elements 74 that prevent any light emission through those interfaces. While the light blocking elements 74 are shown distinct from the prisms 34, some embodiments include the light blocking features of the light blocking elements 74 in the prisms 34. In other words, in some embodiments the prisms 34 provide the reflective visual features described above and the light blocking features to prevent any light from passing through the interfaces 38 between the display panels 22-26 in a manner that may be visible to an observer of the display 20.

Various features for providing a consistent and uniform appearance across a display 20 that includes a plurality of display panels 22-26 are shown in the figures and described above. The different features are useful in various combinations. For example, the polarizer features shown in FIG. 4 may be used in an embodiment that includes a pixel arrangement like that shown in FIG. 5. Alternatively, an embodiment may not include one or both of those features. Those skilled in the art who have the benefit of this description will realize how to combine the disclosed features to achieve a display that meet the needs of their particular situation.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A display, comprising:
   a cover;
   a plurality of display panels that collectively establish a display area;
   a polarizer between the display panels and the cover, the polarizer being coextensive with the entire display area;
   a prism situated along an interface between a first one of the display panels and a second one of the display panels, the prism having reflective surfaces situated at an oblique angle relative to the display panels; and
   at least one controller that controls visual content on the display panels, the at least one controller causing at least some of the visual content near the prism to have at least one of a lower resolution or a lower intensity relative to a resolution or intensity of another portion of the visual content further from the prism.

2. The display of claim 1, wherein
   the cover is a monolithic single piece that is coextensive with the entire display area; and
   the polarizer is a monolithic single piece.

3. The display of claim 1, comprising a single backlight module on a first side of the display panels, the backlight module being configured to provide lighting for the entire display area.

4. The display of claim 3, comprising a light blocking member situated along an interface between two of the display panels, the light blocking member preventing light from the backlight module from being visible on a second side of the display panels that is opposite the first side.

5. The display of claim 3, comprising a case and wherein the backlight module is situated in the case.

6. The display of claim 1, comprising a 1/4 wavelength retarder between the polarizer and the display panels.

7. The display of claim 1, wherein
   at least one of the display panels comprises a liquid crystal display panel;
   the at least one of the display panels includes an active area and an inactive area;
   the inactive area is closer to an edge of the at least one of the display panels than the active area;
   the active area includes a plurality of pixels having a first resolution;
   the inactive area includes a plurality of pixels having second resolution; and
   the second resolution is lower than the first resolution.

8. The display of claim 7, the at least one controller causing a first portion of the visual content with a first resolution to appear on the active area and a second portion of the visual content with a second resolution to appear on the inactive area, and wherein the second resolution is lower than the first resolution.

9. The display of claim 1, wherein the display panels comprise frameless transparent panels.

10. The display of claim 1, wherein a size of at least one of the display panels is different than a size of another one of the display panels.

11. A display, comprising:
    a cover;
    a plurality of display panels that collectively establish a display area;
    a prism situated along an interface between a first one of the display panels and a second one of the display panels, the prism having reflective surfaces situated at an oblique angle relative to the display panels; and
    at least one controller that controls visual content on the display panels, the at least one controller causing at least some of the visual content near the prism to have at least one of a lower resolution or a lower intensity relative to a resolution or intensity of another portion of the visual content further from the prism.

12. The display of claim 11, including a prism situated along each interface between adjacent ones of the display panels.

13. A display, comprising:
    a cover;
    a plurality of display panels that collectively establish a display area, wherein:
       at least one of the display panels comprises a liquid crystal display panel;
       the at least one of the display panels includes an active area and an inactive area;
       the inactive area is closer to an edge of the at least one of the display panels than the active area;
       the active area includes a plurality of pixels having a first resolution;
       the inactive area includes a plurality of pixels having second resolution; and
       the second resolution is lower than the first resolution; and
    at least one controller that controls visual content on the display panels, the at least one controller causing a first portion of the visual content with a first resolution to appear on the active area and a second portion of the visual content with a second resolution to appear on the inactive area, and wherein the second resolution is lower than the first resolution.

* * * * *